(12) United States Patent
Luo et al.

(10) Patent No.: US 12,443,333 B2
(45) Date of Patent: Oct. 14, 2025

(54) METHOD FOR SHARING SCREENSHOT IMAGES AND DEVICE

(71) Applicant: Lenovo (Beijing) Limited, Beijing (CN)

(72) Inventors: Yingwen Luo, Beijing (CN); Xiaoping Zhang, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 84 days.

(21) Appl. No.: 18/232,723

(22) Filed: Aug. 10, 2023

(65) Prior Publication Data
US 2024/0069699 A1    Feb. 29, 2024

(30) Foreign Application Priority Data
Aug. 30, 2022    (CN) .......................... 202211052974.5

(51) Int. Cl.
  *G06F 3/048*    (2013.01)
  *G06F 3/0484*   (2022.01)
(52) U.S. Cl.
  CPC .................................. *G06F 3/0484* (2013.01)
(58) Field of Classification Search
  CPC ....................................................... G06F 3/048
  See application file for complete search history.

(56) References Cited

U.S. PATENT DOCUMENTS

| | | | | |
|---|---|---|---|---|
| 10,237,621 | B2* | 3/2019 | Sharma | H04N 21/4126 |
| 2005/0235222 | A1* | 10/2005 | Barbanson | G06F 3/0481 715/791 |
| 2014/0088764 | A1* | 3/2014 | Naidu | H03K 17/962 700/258 |
| 2014/0189576 | A1* | 7/2014 | Carmi | G06V 10/757 715/781 |
| 2015/0128017 | A1* | 5/2015 | Fithian | G06F 40/134 715/205 |
| 2016/0266757 | A1* | 9/2016 | Ye | G06F 3/048 |
| 2017/0280200 | A1* | 9/2017 | Sharma | H04N 21/4788 |
| 2018/0088764 | A1* | 3/2018 | Lu | G06F 3/0484 |
| 2019/0147026 | A1* | 5/2019 | Jon | G06F 3/04883 715/230 |
| 2019/0266034 | A1* | 8/2019 | Wang | G06F 3/04845 |
| 2020/0012542 | A1* | 1/2020 | Shapiro | G06F 9/542 |
| 2021/0072880 | A1* | 3/2021 | Mathur | G06F 3/0485 |
| 2021/0286191 | A1* | 9/2021 | Downing | G01S 7/4815 |
| 2021/0286491 | A1* | 9/2021 | Duan | G06F 3/0485 |
| 2022/0343006 | A1* | 10/2022 | Ceballos Melo | G06F 21/6245 |
| 2024/0126424 | A1* | 4/2024 | Xu | G06F 3/0482 |

* cited by examiner

*Primary Examiner* — Linh K Pham
(74) *Attorney, Agent, or Firm* — ANOVA LAW GROUP, PLLC (57) ABSTRACT

A method for sharing screenshot images includes, in response to a screenshot instruction, obtaining a screenshot image, based on the screenshot image, determining an object associated with the screenshot image, displaying a recommended area in a screenshot image sharing area, and in response to a trigger instruction on the operation controller of the object, sharing the screenshot image with the object. The recommended area includes at least an operation controller of the object.

18 Claims, 7 Drawing Sheets

METHOD FOR SHARING SCREENSHOT IMAGES AND DEVICE

CROSS-REFERENCE TO RELATED APPLICATION

The present disclosure claims priority to Chinese Patent Application No. 202211052974.5, filed on Aug. 30, 2022, the entire content of which is incorporated herein by reference.

TECHNICAL FIELD

The present disclosure relates to the computer technology field and, more particularly, to a method for sharing a screenshot image.

BACKGROUND

A user saves a screenshot image through a screenshot. The user shares the screenshot image with other people. However, the user needs to perform a plurality of operations to share the screenshot image. The operation is complex, which affects user experience.

SUMMARY

Embodiments of the present disclosure provide a method for sharing screenshot images. The method includes in response to a screenshot instruction, obtaining a screenshot image, based on the screenshot image, determining an object associated with the screenshot image, displaying a recommended area in a screenshot image sharing area, and in response to a trigger instruction on the operation controller of the object, sharing the screenshot image with the object. The recommended area includes at least an operation controller of the object.

Embodiments of the present disclosure provide an electronic device, including one or more memories and one or more processors. The one or more memories store instructions that, when executed by the one or more processors, cause the one or more processors to, in response to a screenshot instruction, obtain a screenshot image, based on the screenshot image, determine an object associated with the screenshot image, display a recommended area in a screenshot image sharing area, and in response to a trigger instruction on the operation controller of the object, share the screenshot image with the object. The recommended area includes at least an operation controller of the object.

Embodiments of the present disclosure provide a non-transitory computer-readable storage medium storing a computer program that, when executed by one or more processors, causes the one or more processors to, in response to a screenshot instruction, obtain a screenshot image, based on the screenshot image, determine an object associated with the screenshot image, display a recommended area in a screenshot image sharing area, and in response to a trigger instruction on the operation controller of the object, share the screenshot image with the object. The recommended area includes at least an operation controller of the object.

DETAILED DESCRIPTION OF THE EMBODIMENTS

The technical solutions of embodiments of the present disclosure are described in detail below in connection with the accompanying drawings of embodiments of the present disclosure. Described embodiments are only some embodiments of the present disclosure and not all embodiments. All other embodiments obtained by those skilled in the art based on embodiments in the present disclosure without creative efforts should be within the scope of the present disclosure.

To make the objectives, technical solutions, and advantages of embodiments of the present disclosure more obvious, the present disclosure is further described in detail in connection with the accompanying drawings and embodiments of the present disclosure.

Figure 1:
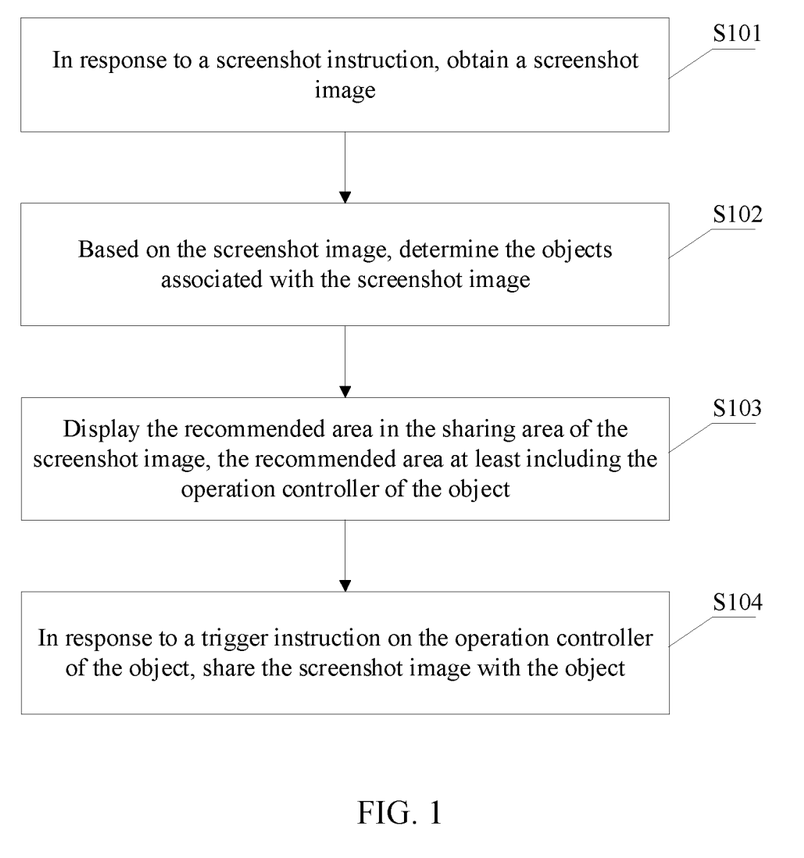
FIG. 1 illustrates a schematic flowchart of a method for sharing screenshot images according to some embodiments of the present disclosure.

FIG. 1 illustrates a schematic flowchart of a method for sharing screenshot images according to some embodiments of the present disclosure. The method can be applied to an electronic device. A product type of electronic device is not limited in the present disclosure. As shown in FIG. 1, the method includes but is not limited to the following processes.

At S101, in response to a screenshot instruction, a screenshot image is obtained.

In some embodiments, the screenshot instruction can be used to indicate performing the screenshot operation on the target display image. The screenshot instruction can be generated through an operation manner of touching, audio, or gesture, which is not limited in the present disclosure.

A target display image is not limited in the present disclosure. For example, the target display image can be a display image represented in an application, that the user wants to share, such as the display image including a health code in Wechat, the display image including travel information in Wechat, or the display image corresponding to the website page content in the browser. The target display image can also be the display image corresponding to the desktop of the monitor shared by the user.

In some embodiments, in response to the screenshot instruction, the obtained screenshot image can include at least the image information of the target display screen.

At S102, based on the screenshot image, the objects associated with the screenshot image are determined.

In some embodiments, the objects associated with the screenshot image can include, but are not limited to, the application associated with the screenshot image. The application associated with the screenshot image can include, but is not limited to, a social application (e.g., WeChat application) and/or a cloud storage service application.

One or more applications can be associated with the screenshot image.

The objects associated with the screenshot image can also include, but are not limited to, a target contact user or a target contact user group of the application associated with the screenshot image.

The presentation of the target contact user group of the application associated with the screenshot image is not limited in the present disclosure. For example, if the application associated with the screenshot image is WeChat, the target contact user group can be a group chat or moment share in WeChat.

If the object associated with the screenshot image is a target contact user or a target contact user group in the application associated with the screenshot image, an operation controller of the application associated with the screenshot image can be included in an area of a sharing area of the screenshot image except for a recommended area. For example, if the target contact user of the application associated with the screenshot image is a head teacher of a ding-ding application, the operation controller of the head teacher of the ding-ding application can be included in the recommended area. The area of the sharing area of the screenshot image except for the recommended area can include the operation controller of the ding-ding application.

At S103, the recommended area is displayed in the sharing area of the screenshot image, and the recommended area at least includes the operation controller of the object.

Displaying the recommended area in the sharing area of the screenshot image includes but is not limited to the following processes.

At S1031, in response to a first trigger event, the recommended area is displayed in the sharing area of the screenshot image.

In some embodiments, the method is not limited to generating the first trigger event by triggering the screenshot image-sharing area. Displaying the recommended area in the screenshot image sharing area can include but is not limited to the following processes.

At S1032, the recommended area is automatically displayed in the screenshot image-sharing area.

In some embodiments, by operating the operation controller of the objects, the sharing operation can be executed to share the screenshot image with the objects.

When a plurality of objects are associated with the screenshot image, the recommended area can include operation controllers of the plurality of objects.

At S104, in response to a trigger instruction on the operation controller of the object, the sharing operation is performed to share the screenshot image with the object.

When the plurality of objects are associated with the screenshot image, the user can trigger the operation controllers of the plurality of objects in the recommended area simultaneously. Accordingly, the electronic device can respond to the trigger instructions of the operation controllers of the plurality of objects to perform the sharing operation to share the screenshot image with the plurality of objects.

In some embodiments, the trigger instruction can be used to instruct the electronic device to perform the sharing operation to share the screenshot image with the object. In some embodiments, the trigger instruction of the operation controller of the object can, but is not limited to, be generated in an operation manner of touch, voice, or gesture.

Figure 2:
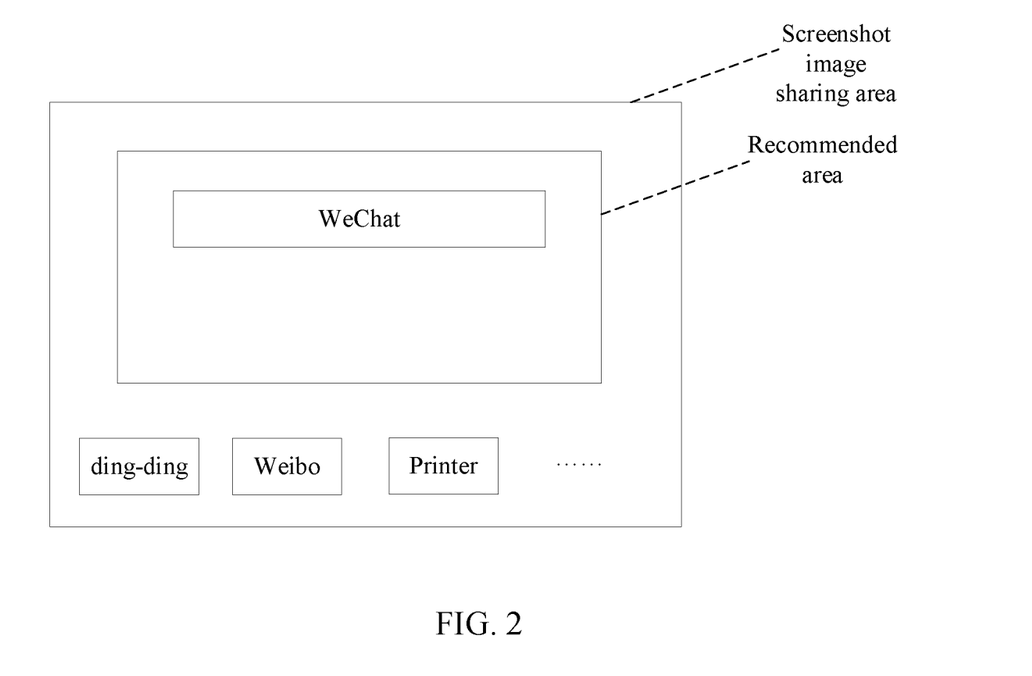
FIG. 2 illustrates a schematic diagram showing an implementation scene of a method for sharing screenshot images according to some embodiments of the present disclosure.

In some embodiments, the method includes, in response to the screenshot instruction, obtaining the screenshot image, based on the screenshot image, determining the object associated with the screenshot image, and displaying the recommended area in the screenshot image sharing area. The recommended area can include at least the operation controller of the object. Thus, the user can directly trigger the operation controller of the object associated with the screenshot image in the recommended area to share the screenshot image with the object. The user does not need to perform a plurality of operations to select the object associated with the screenshot image, which simplifies the sharing operation and improves the user experience. For example, if the screenshot image is a screenshot image including the health code or travel information, the application associated with the screenshot image can be determined to be WeChat based on the screenshot image. As shown in FIG. 2, the recommended area is displayed in the screenshot image-sharing area. The recommended area includes the operation controller of WeChat. Thus, WeChat is displayed differently from other applications (e.g., ding-ding application, Webo application, or printing application). The user does not need to search for WeChat from the plurality of applications. The user can directly trigger the operation controller of WeChat in the recommended area to simplify the sharing operation.

Figure 3:
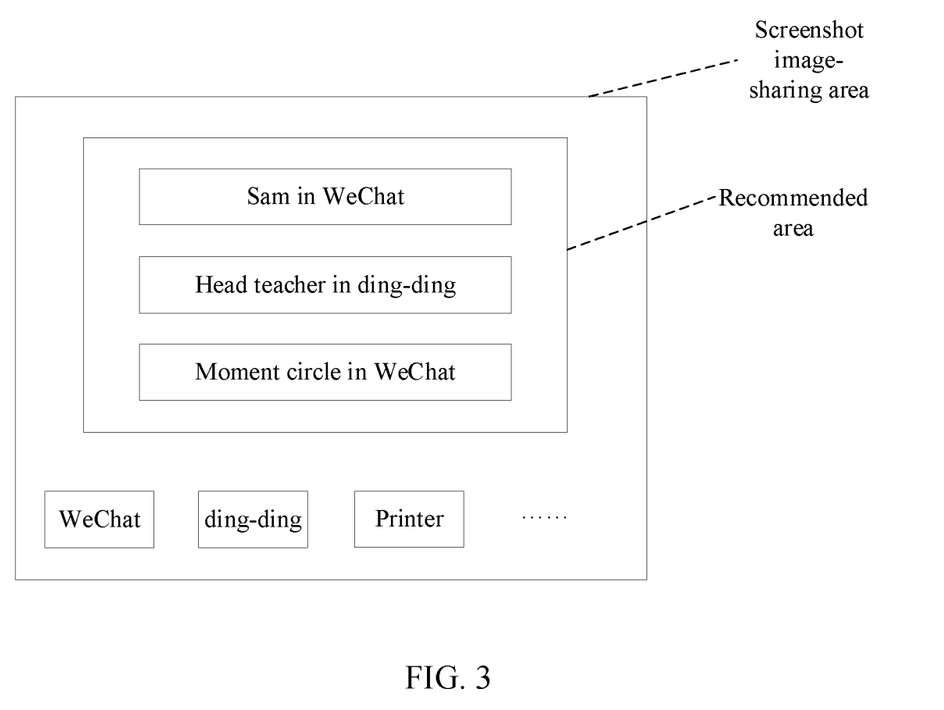
FIG. 3 illustrates a schematic diagram showing another implementation scene of a method for sharing screenshot images according to some embodiments of the present disclosure.

In another example, if the screenshot image includes the health code or travel information, a target contact user associated with the screenshot image can be determined to be the head teacher in the ding-ding application and Sam in WeChat based on the screenshot image. Moreover, a determined target contact user group of the application associated with the screenshot image can be the moment circle in WeChat. As shown in FIG. 3, the recommended area is displayed in the screenshot image-sharing area. The recommended area includes the operation controller of the head teacher in the ding-ding application. The user can directly trigger the operation controller of the head teacher in the ding-ding application in the recommended area to share the screenshot image with the head teacher. The user does not need to perform a series of operations including searching for the ding-ding application in a scroll-down application list, clicking the ding-ding sign, searching for the head teacher by scrolling down the ding-ding user list, and then clicking the head teacher, which simplifies the sharing operation.

Figure 4:
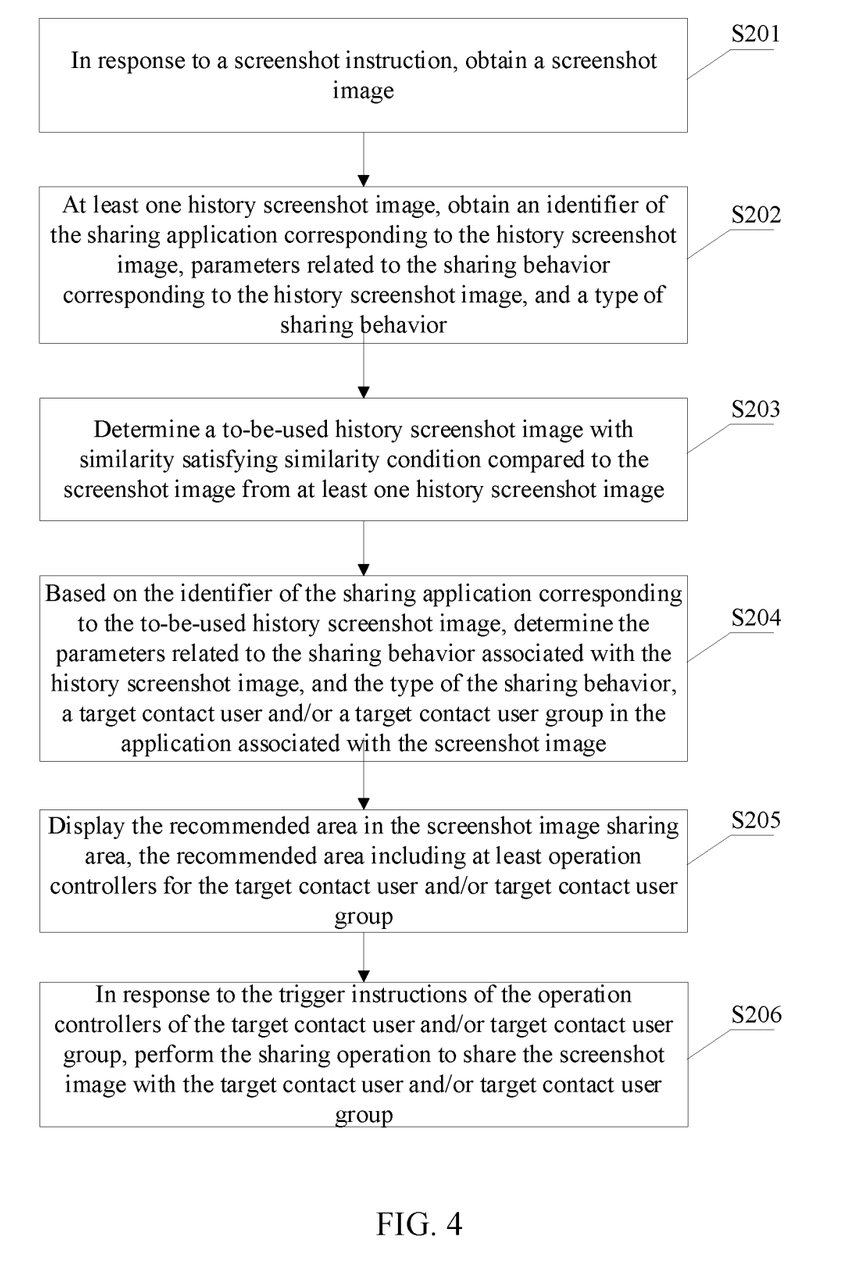
FIG. 4 illustrates a schematic flowchart of a method for sharing screenshot images according to some embodiments of the present disclosure.

In some other embodiments, FIG. 4 illustrates a schematic flowchart of a method for sharing screenshot images according to some embodiments of the present disclosure. This method is a further detailed solution for the method for sharing screenshot images above. The method includes but is not limited to the following processes.

At S201, in response to a screenshot instruction, a screenshot image is obtained.

For the detailed process of step S201, reference can be made to the relevant description of step S101, which is not repeated here.

At S202, at least one history screenshot image, an identifier of the sharing application corresponding to the history screenshot image, parameters related to the sharing behavior corresponding to the history screenshot image, and a type of sharing behavior are obtained.

Based on the identifier of the sharing application corresponding to the history screenshot image, the application that receives the history screenshot image can be determined.

Based on the parameters related to the sharing behavior associated with the history screenshot image, the object on which the sharing behavior corresponding to the history screenshot image is performed can be determined in the sharing application. For example, if the sharing application corresponding to the history screenshot image is WeChat, the sharing behavior corresponding to the history screenshot image can include sharing with a target contact user, and the parameters related to the sharing behavior corresponding to the history screenshot image can include the name of the target contact user.

The type of the sharing behavior can include, but is not limited to, sharing with a single contact user, a contact user group, or a folder, such as a favorites folder in WeChat.

At S203, a to-be-used history screenshot image with similarity satisfying similarity condition compared to the screenshot image is determined from at least one history screenshot image.

Step S203 can include but is not limited to the following steps.

At S2031, the to-be-used history screenshot image with the similarity greater than similarity threshold compared to the screenshot image is determined from at least one history screenshot image.

At S2032, the similarities between history screenshot images of the at least one history screenshot image and the screenshot image are determined.

At S2033, the similarities between the history screenshot images and the screenshot image are sorted in descending order to obtain a sorting result. Based on the sorting result, top n history screenshot images from the at least one history screenshot image are used as the to-be-used history screenshot images. n can be set as needed and is not limited in the present disclosure.

At S204, based on the identifier of the sharing application corresponding to the to-be-used history screenshot image, the parameters related to the sharing behavior associated with the history screenshot image, and the type of the sharing behavior, a target contact user and/or a target contact user group in the application associated with the screenshot image is determined.

Step S204 can include but is not limited to the following steps.

At S2041, based on the identifier of the sharing application corresponding to the to-be-used history screenshot image, the application associated with the screenshot image is determined.

At S2042, if the type of the sharing behavior corresponding to the to-be-used history screenshot image is sharing with a contact user, based on the parameters related to the sharing behavior associated with the to-be-used history screenshot image, a target contact user in the application associated with the screenshot image is determined.

For example, the application associated with the screenshot image can be WeChat, and the type of the sharing behavior is sharing with a contact user. The parameters related to the sharing behavior can be the name of the contact user (e.g., Sam). Then, the object associated with the screenshot image can be determined to be Sam in WeChat.

At S2043, if the type of the sharing behavior corresponding to the to-be-used history screenshot images is sharing with a contact user group, based on the parameters related to the sharing behavior associated with the to-be-used history screenshot images, a target contact user group in the application associated with the screenshot image is determined.

For example, the application associated with the screenshot image can be WeChat, and the type of sharing behavior is sharing with a contact user group. The parameters related to the sharing behavior can be the name of the contact user group (e.g., moment circle). Then the object associated with the screenshot image can be determined to be a moment circle in WeChat.

At S2044, if the type of the sharing behavior corresponding to the to-be-used history screenshot image is sharing with a contact user and a contact user group, based on the parameters related to the sharing behavior associated with the to-be-used history screenshot images, a target contact user and a target contact user group in the application associated with the screenshot image are determined.

For example, the application associated with the screenshot image can be WeChat, and the type of the sharing behavior can be shared with a contact user and a contact user group. The parameters related to the sharing behavior can be the names of the contact user (e.g., Sam) and the contact user group (e.g., moment circle). Then, the object associated with the screenshot image can be determined to be Sam and the moment circle in WeChat.

Steps S202 to S204 can be specific embodiments of Step S102.

At S205, the recommended area is displayed in the screenshot image sharing area, where the recommended area includes at least operation controllers for the target contact user and/or target contact user group.

At S206, in response to the trigger instructions of the operation controllers of the target contact user and/or target contact user group, the sharing operation is performed to share the screenshot image with the target contact user and/or target contact user group.

Steps S205 and S206 are specific embodiments of Step S103 and Step S104.

In some embodiments, the method can include, in response to the screenshot instruction, obtaining the screenshot image, determining the to-be-used history screenshot image with the similarity satisfying the similarity condition compared to the screenshot image from the at least one history screenshot image, determining the target contact user and/or the target contact user group in the application associated with the screenshot image based on the identifier of the sharing application corresponding to the to-be-used history screenshot image, the parameters related to the sharing behavior corresponding to the to-be-used history screenshot image, and the type of the sharing behavior, and displaying the recommended area in the screenshot image sharing area. The recommended area can at least include the operation controllers of the target contact user and/or target contact user group. Thus, the user can directly trigger the operation controllers of the target contact user and/or target contact user group in the recommended area to share the screenshot image with the target contact user and/or target contact user group. The user may not need to perform a plurality of operations to select the target contact user and/or target contact user group, which simplifies the sharing process and improves the user experience.

Figure 5:
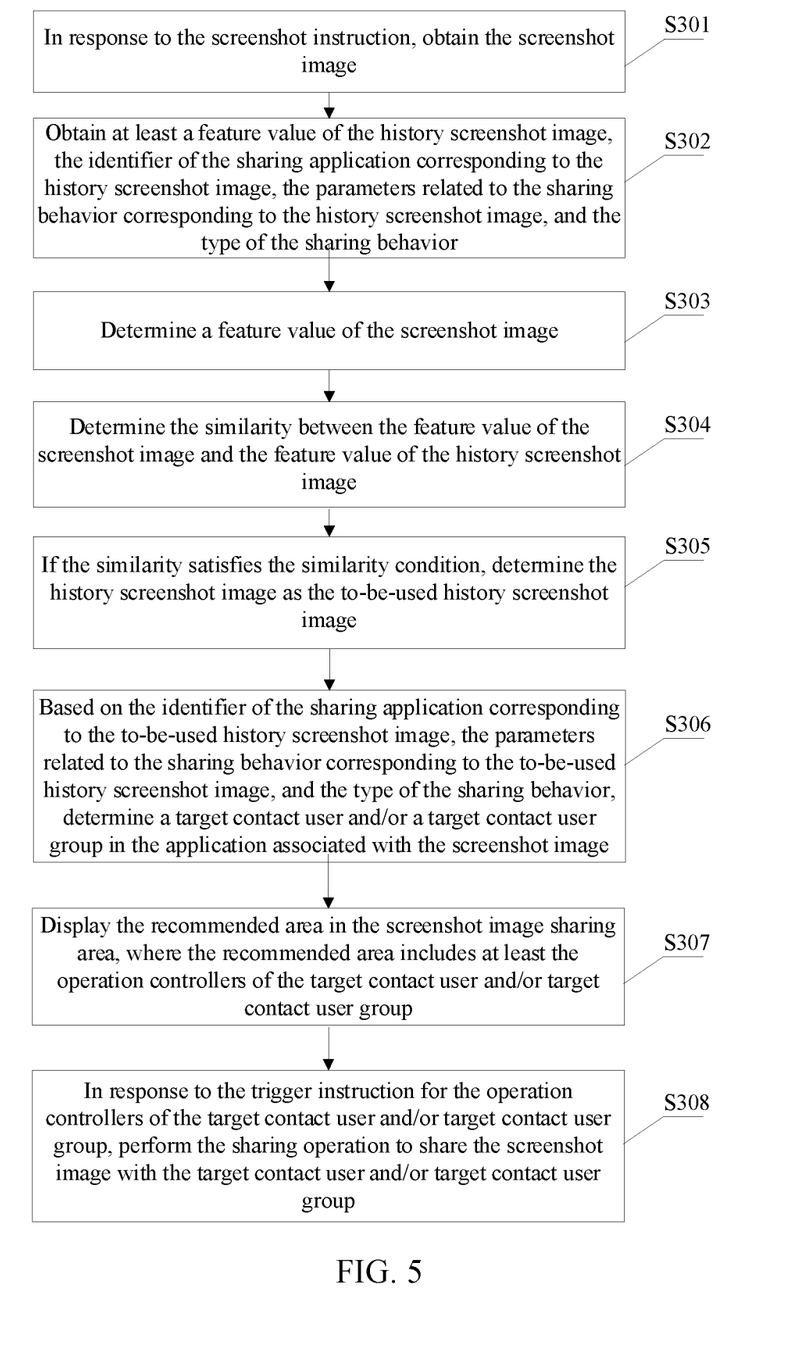
FIG. 5 illustrates a schematic flowchart of a method for sharing screenshot images according to some embodiments of the present disclosure.

In some other embodiments of the present disclosure, FIG. 5 illustrates a schematic flowchart of a method for sharing screenshot images according to some embodiments of the present disclosure. This method is a further detailed solution for the method for sharing screenshot images above. The method includes but is not limited to the following processes.

At S301, in response to the screenshot instruction, the screenshot image is obtained.

For the detailed process of Step S301, reference can be made to the relevant description of Step S201, which is not repeated here.

At S302, at least a feature value of the history screenshot image, the identifier of the sharing application corresponding to the history screenshot image, the parameters related to the sharing behavior corresponding to the history screenshot image, and the type of the sharing behavior are obtained.

In some embodiments, the feature value of the history screenshot image can be used to represent the history screenshot image. The feature value of the history screenshot image can include but is not limited to a hash value of the history screenshot image.

Step S302 is a specific embodiment of Step S202.

At S303, a feature value of the screenshot image is determined.

When the feature value corresponding to the history screenshot image is the hash value of the history screenshot image, step 303 can include but is not limited to based on a hash algorithm, determining the hash value of the screenshot image.

At S304, the similarity between the feature value of the screenshot image and the feature value of the history screenshot image is determined.

Step S304 can include but is not limited to the following steps.

At S3041, the similarity between the hash value of the screenshot image and the hash value of the history screenshot image is calculated.

Step S3041 can include, but is not limited to calculating a Hamming distance between the hash value of the screenshot image and the hash value of the history screenshot image.

When the Hamming distance is smaller, the screenshot image is more similar to the history screenshot image.

At Step S305, if the similarity satisfies the similarity condition, the history screenshot image is determined as the to-be-used history screenshot image.

The similarity satisfying the similarity condition can include, but is not limited to, the Hamming distance satisfying a predetermined distance threshold.

Steps S303 to S305 are specific embodiments of Step S203.

At S306, based on the identifier of the sharing application corresponding to the to-be-used history screenshot image, the parameters related to the sharing behavior corresponding to the to-be-used history screenshot image, and the type of the sharing behavior, a target contact user and/or a target contact user group in the application associated with the screenshot image are determined.

At S307, the recommended area is displayed in the screenshot image sharing area, where the recommended area includes at least the operation controllers of the target contact user and/or target contact user group.

At S308, in response to the trigger instruction for the operation controllers of the target contact user and/or target contact user group, the sharing operation is performed to share the screenshot image with the target contact user and/or target contact user group.

For the detailed processes of steps S307 and S308, reference can be made to the related description in steps S205 and S206, which are not repeated here.

In some embodiments, the method can include, in response to the screenshot instruction, obtaining the screenshot image, determining the feature value of the screenshot image, and determining the similarity between the feature value of the screenshot image and the feature value of the history screenshot image. If the similarity satisfies the similarity condition, the history screenshot image can be determined as the to-be-used history screenshot image. Based on the identifier of the sharing application corresponding to the to-be-used history screenshot image, the parameters related to the sharing behavior corresponding to the to-be-used history screenshot image, and the type of the sharing behavior, the target contact user and/or the target contact user group in the application associated with the screenshot image can be determined. The recommended area can be displayed in the screenshot image-sharing area. The recommended area can at least include operation controllers for the target contact user and/or target contact user group. Then, the user can directly trigger the operation controllers for the target contact user and/or target contact user group in the recommended area to share the screenshot image with the target contact user and/or target contact user group. The user may not need to perform the plurality of operations to select the target contact user and/or target contact user group, which simplifies the sharing process and improves the user experience.

Furthermore, the feature value of the screenshot image and the similarity between the feature value of the screenshot image and the feature value of the history screenshot image can be determined. If the similarity satisfies the similarity condition, the history screenshot image can be determined as the to-be-used history screenshot image, which can reduce the computational workload and improve the overall efficiency of screenshot image sharing.

Figure 6:
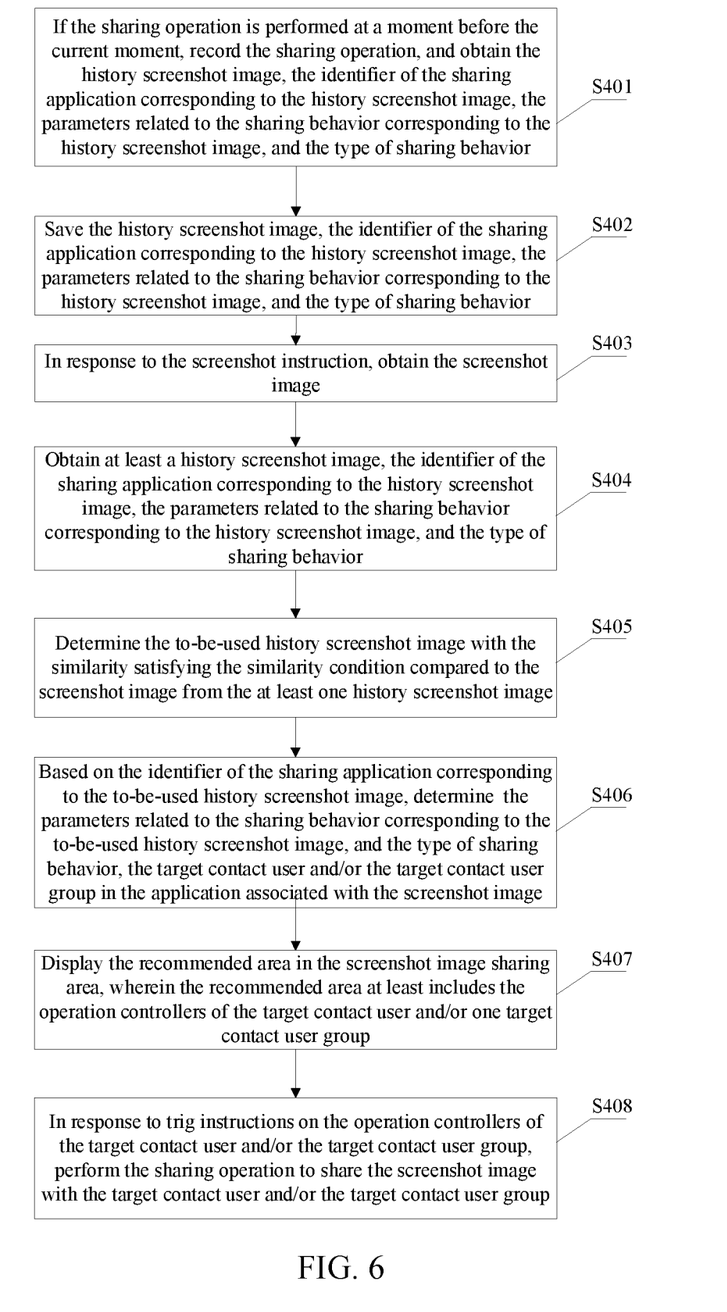
FIG. 6 illustrates a schematic flowchart of a method for sharing screenshot images according to some embodiments of the present disclosure.

In some other embodiments of the present disclosure, FIG. 6 illustrates a schematic flowchart of a method for sharing screenshot images according to some embodiments of the present disclosure. This method is an expansion solution of the method for sharing screenshot images above. The method includes but is not limited to the following steps.

At S401, if the sharing operation is performed at a moment before the current moment, the sharing operation is recorded, and the history screenshot image, the identifier of the sharing application corresponding to the history screenshot image, the parameters related to the sharing behavior corresponding to the history screenshot image, and the type of sharing behavior are obtained.

If the sharing operation is performed at a moment before the current moment, the sharing operation can be recorded. Thus, each sharing operation before the current moment can be recorded.

At S402, the history screenshot image, the identifier of the sharing application corresponding to the history screenshot image, the parameters related to the sharing behavior corresponding to the history screenshot image, and the type of sharing behavior are saved.

In some embodiments, the method includes but is not limited to storing the history screenshot image, the identifier of the sharing application corresponding to the history screenshot image, the parameters related to the sharing behavior corresponding to the history screenshot image, and the type of sharing behavior in local storage of the electronic device and/or the cloud storage server.

In some embodiments, storing the history screenshot image can include but is not limited to storing the feature value of the history screenshot image.

Storing the feature value of the history screenshot image can save storage space compared to storing the history screenshot image.

At S403, in response to the screenshot instruction, the screenshot image is obtained.

At S404, at least a history screenshot image, the identifier of the sharing application corresponding to the history screenshot image, the parameters related to the sharing behavior corresponding to the history screenshot image, and the type of sharing behavior are obtained.

In some embodiments, the at least one history screenshot image, the identifier of the sharing application corresponding to the history screenshot image, the parameters related to the sharing behavior corresponding to the history screenshot image, and the type of sharing behavior can be obtained from the stored history screenshot images, the identifiers of the sharing application corresponding to the history screenshot image, the parameters related to the sharing behavior corresponding to the history screenshot image, and the types of sharing behavior.

At S405, the to-be-used history screenshot image with the similarity satisfying the similarity condition compared to the screenshot image is determined from the at least one history screenshot image.

At S406, based on the identifier of the sharing application corresponding to the to-be-used history screenshot image, the parameters related to the sharing behavior corresponding to the to-be-used history screenshot image, and the type of sharing behavior, the target contact user and/or the target contact user group in the application associated with the screenshot image are determined.

At S407, the recommended area is displayed in the screenshot image sharing area, wherein the recommended area at least includes the operation controllers of the target contact user and/or one target contact user group.

At S408, in response to trig instructions on the operation controllers of the target contact user and/or the target contact user group, the sharing operation is performed to share the screenshot image with the target contact user and/or the target contact user group.

For the detailed processes of steps S403 to S408, reference can be made to the related description of steps S201 to S206, which are not repeated here. In some embodiments, for the specific implementation of steps S404 and S405, reference can be made to the related description of steps S202 and S203, which are not repeated here.

In some embodiments, if the sharing operation is performed at a moment before the current moment, the sharing operation can be recorded, and the history screenshot image, the identifier of the sharing application corresponding to the history screenshot image, the parameters related to the sharing behavior corresponding to the history screenshot image, and the type of the sharing behavior can be obtained and stored. The history screenshot image, the identifier of the sharing application corresponding to the history screenshot image, the parameters associated with the sharing behavior corresponding to the history screenshot image, and the type of the sharing behavior corresponding to each sharing operation performed at the moment before the current moment can be stored.

Based on storing the above content, the method can include in response to the screenshot instruction, obtaining the screenshot image, and determining the to-be-used history screenshot image with the similarity satisfying the similarity condition compared to the screenshot image from the at least one history screenshot image. Based on the identifier of the sharing application corresponding to the to-be-used history screenshot image, the parameters related to the sharing behavior corresponding to the to-be-used history screenshot image, and the type of the sharing behavior, the target contact user and/or the target contact user group of the application associated with the screenshot image can be determined. The recommended area can be displayed in the screenshot image-sharing area. The recommended area can at least include the operation controllers of the target contact user and/or the target contact user group. Thus, the user can directly trigger the operation controllers of the target contact user and/or the target contact user group to share the screenshot image with the target contact user and/or the target contact user group. The user may not need to perform a plurality of operations to select the target contact user and/or target contact user group, which simplifies the sharing process and improves the user experience.

Then, a screenshot image-sharing device of embodiments of the present disclosure is described below. The screenshot image-sharing device described below can refer to the method for sharing screenshot images described above.

Figure 7:
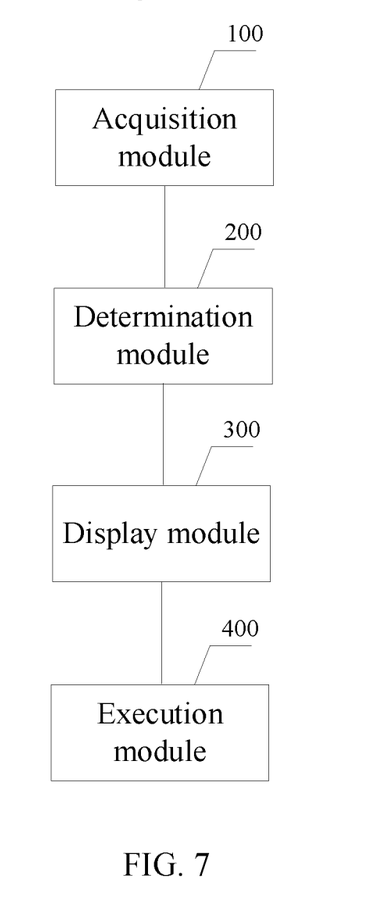
FIG. 7 illustrates a schematic structural diagram of a screenshot image-sharing device according to some embodiments of the present disclosure.

As shown in FIG. 7, the screenshot image-sharing device includes an acquisition module 100, a determination module 200, a display module 300, and an execution module 400.

The acquisition module 100 can be configured to in response to the screenshot instruction, obtain the screenshot image.

The determination module 200 can be configured to, based on the screenshot image, determine the object associated with the screenshot image.

In some embodiments, the object associated with the screenshot image can include an application associated with the screenshot image or a target contact user and/or a target contact user group in the application associated with the screenshot image.

The display module 300 can be configured to display the recommended area in the screenshot image-sharing area. The recommended area can at least include the operation controllers of the object.

The execution module 400 can be configured to, in response to the trigger instruction of the operation controller of the object, perform the sharing operation to share the screenshot image with the object.

In some embodiments, the determination module 200 can be configured to obtain at least one history screenshot image, the identifier of the sharing application corresponding to the history screenshot image, the parameters related to the sharing behavior corresponding to the history screenshot image, and the type of sharing behavior, determine at least one history screenshot image with the similarity compared to the screenshot image satisfying the similarity condition from the at least one history screenshot image, and based on the identifier of the sharing application corresponding to the to-be-used history screenshot image, the parameters associated with the sharing behavior corresponding to the to-be-used history screenshot image, and the type of the sharing behavior, determine the target contact user and/or the target contact user group of the application associated with the screenshot image.

In some embodiments, obtaining at least one history screenshot image by the determination module 200 can include obtaining the feature value of the at least one history screenshot image.

Correspondingly, determining the to-be-used history screenshot image with the similarity with the screenshot image satisfying the similarity condition from the at least one history screenshot image can include determining the feature value of the screenshot image, determining the similarity between the screenshot image and the history screenshot image, and if the similarity satisfying the similarity condition, determine the history screenshot image as the to-be-used history image.

In embodiments of the present disclosure, the screenshot image-sharing device can further include a recording module and a storage module.

The recording module can be configured to if the sharing operation is performed at a moment before the current moment, record the sharing operation to obtain the history screenshot image, the identifier of the sharing application corresponding to the history screenshot image, the parameters related to the sharing behavior corresponding to the history screenshot image, and the type of the sharing behavior.

The storage module can be configured to store the history screenshot image, the identifier of the sharing application corresponding to the history screenshot image, the parameters related to the sharing behavior corresponding to the history screenshot image, and the type of the sharing behavior.

In some embodiments, storing the history screenshot image by the storage module can include storing the feature value of the history screenshot image.

In embodiments of the present disclosure, the display module 300 can be configured to, in response to the first trigger event, display the recommended area in the screenshot image sharing area, or automatically display the recommended area in the screenshot image sharing area.

Corresponding to method for sharing screenshot images embodiments of the present disclosure, the present disclosure can also provide electronic device embodiments that deploy the method for sharing screenshot images.

Figure 8:
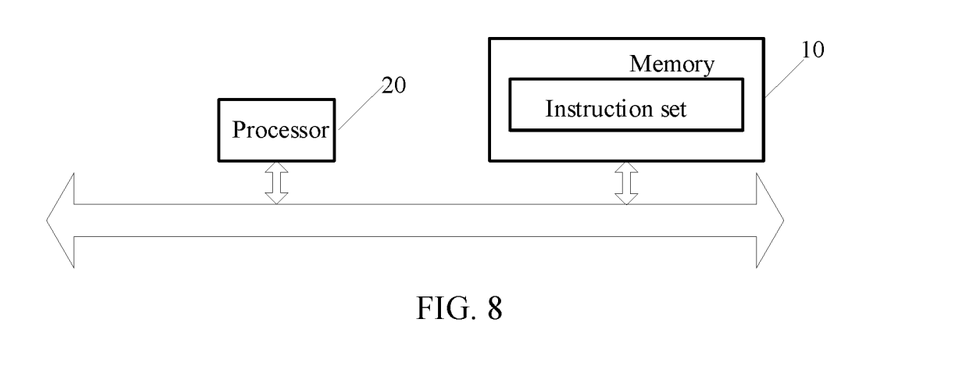
FIG. 8 illustrates a schematic structural diagram of an electronic device according to some embodiments of the present disclosure.

FIG. 8 illustrates a schematic structural diagram of an electronic device according to embodiments of the present disclosure. The electronic device includes one or more memories 10 and one or more processors 20.

The one or more memories 10 can be used to store at least an instruction set.

The one or more processors 20 can be configured to call and execute the instruction set in the one or more memories 10 and perform the screenshot image sharing method above by executing the instruction set.

Corresponding to method for sharing screenshot images embodiments of the present disclosure, the present disclosure further provides a storage medium.

In some embodiments, the storage medium can store a computer program that is used to implement the method for sharing screenshot images described above. When the computer program is performed by a processor, the processor is configured to perform the method for sharing screenshot images of embodiments of the present disclosure.

Each embodiment focuses on the differences from the other embodiments. The common and similar aspects among embodiments can be referred to each other. Since device embodiments are generally similar to method embodiments, the description can be relatively simple. For relevant parts, reference can be made to the corresponding sections of the method embodiments.

In the present disclosure, terms such as "first" and "second" are merely used to distinguish one entity or operation from another, without necessarily implying any actual relationship or sequence between these entities or operations. Moreover, terms such as "comprising," "including," or any other variations are intended to encompass non-exclusive inclusion, so that processes, methods, items, or devices including a series of elements include not only those elements explicitly listed but also other elements that are not explicitly mentioned but inherently part of such processes, methods, items, or devices. Unless otherwise specified, the term "including a . . . " does not exclude the presence of additional identical elements in processes, methods, items, or devices including the specified element.

To facilitate the description, the above device can be described by dividing the functions into various modules for description. In the present disclosure, the functions of the modules can be implemented in one or more same software and/or hardware.

Based on the description of embodiments of the present disclosure, those skilled in the art can understand that the present disclosure can be implemented using software combined with necessary general hardware platforms. With this understanding, the essence of the technical solution or the part that contributes to the existing technology of the present disclosure can be implemented by a software product. The computer software product can be stored in a storage medium, such as ROM/RAM, magnetic disc, optical disc, etc. The computer software product can include some instructions that are used to cause the computer (e.g., a personal computer, server, or network device, etc.) to execute the method of various embodiments or certain parts of embodiments of the present disclosure.

The method for sharing screenshot images and device of embodiments of the present disclosure are described in detail. The principle and implementation of the present disclosure are described in the present disclosure. Embodiments of the present disclosure can only be used to help understand the method and the core idea of the method of the present disclosure. Meanwhile, according to the idea of the present disclosure, those of ordinary skill in the art can make modifications to embodiments and scope of the present disclosure. Thus, the content of the specification does not limit the present disclosure.

What is claimed is:

1. A method for sharing screenshot images comprising:
in response to a screenshot instruction, obtaining a screenshot image;
based on the screenshot image, determining an object associated with the screenshot image, including:
obtaining at least one history screenshot image, an identifier of a sharing application corresponding to the history screenshot image, a parameter related to a sharing behavior corresponding to the history screenshot image, and a type of the sharing behavior;
displaying a recommended area in a sharing area of the screenshot image, including:
in response to the object associated with the screenshot images including at least a target contact user or a target contact user group in an application associated with the screenshot image, displaying an operation controller of the application in an area of the sharing area of the screenshot image except for the recommended area, and displaying an operation controller of at least one of the target contact user or the target contact user group in the recommended area; and
in response to a trigger instruction on the operation controller of the object, sharing the screenshot image with the object.

2. The method according to claim 1, wherein the object associated with the screenshot image includes an application associated with the screenshot image.

3. The method according to claim 1, wherein determining the object associated with the screenshot image based on the screenshot image includes:

determining a to-be-used history screenshot image with similarity to the screenshot image satisfying similarity condition from the at least one history screenshot image; and based on the identifier of the sharing application corresponding to the history screenshot image, the parameter related to the sharing behavior corresponding to the history screenshot image, and the type of the sharing behavior, determining the target contact user and/or the target contact user group in the application associated with the screenshot image.

4. The method according to claim 3, wherein:
obtaining the at least one history screenshot image includes:
obtaining a feature value of the at least one history screenshot image; and
determining the to-be-used history screenshot image with the similarity to the screenshot image satisfying the similarity condition from the at least one history screenshot image includes:
determining a feature value of the screenshot image;
determining similarity between the feature value of the screenshot image and the feature value of the history screenshot image; and
in response to the similarity satisfying the similarity condition, determining the history screenshot image to be the to-be-used history screenshot image.

5. The method according to claim 3, further comprising, before obtaining the screenshot image in response to the screenshot instruction:
if the screenshot image is shared before a current moment, recording the sharing to obtain the history screenshot image, the identifier of the sharing application corresponding to the history screenshot image, the parameter related to the sharing behavior corresponding to the history screenshot image, and the type of the sharing behavior; and
storing the history screenshot image, the identifier of the sharing application corresponding to the history screenshot image, the parameter related to the sharing behavior corresponding to the history screenshot image, and the type of the sharing behavior.

6. The method according to claim 5, wherein storing the history screenshot image includes:
storing a feature value of the history screenshot image.

7. The method according to claim 1, wherein displaying the recommended area in the sharing area of the screenshot image includes:
in response to a first trigger event, displaying the recommended area in the sharing area of the screenshot image.

8. The method according to claim 1, wherein displaying the recommended area in the sharing area of the screenshot image includes:
automatically displaying the recommended area in the sharing area of the screenshot image.

9. An electronic device comprising:
one or more processors; and
one or more memories storing instructions that, when executed by the one or more processors, cause the one or more processors to:
in response to a screenshot instruction, obtain a screenshot image;
based on the screenshot image, determine an object associated with the screenshot image, including:
obtaining at least one history screenshot image, an identifier of a sharing application corresponding to the history screenshot image, a parameter related to a sharing behavior corresponding to the history screenshot image, and a type of the sharing behavior;
display a recommended area in a sharing area of the screenshot image, including:
in response to the object associated with the screenshot images including at least a target contact user and/or a target contact user group in an application associated with the screenshot image, displaying an operation controller of the application in an area of the sharing area of the screenshot image except for the recommended area, and displaying an operation controller of the target contact user and/or the target contact user group in the recommended area; and
in response to a trigger instruction on the operation controller of the object, share the screenshot image with the object.

10. The device according to claim 9, wherein the object associated with the screenshot image includes an application associated with the screenshot image.

11. The device according to claim 9, wherein the one or more processors are further configured to:
obtain at least one history screenshot image, an identifier of a sharing application corresponding to the history screenshot image, a parameter related to a sharing behavior corresponding to the history screenshot image, and a type of the sharing behavior;
determine a to-be-used history screenshot image with similarity to the screenshot image satisfying similarity condition from the at least one history screenshot image; and
based on the identifier of the sharing application corresponding to the history screenshot image, the parameter related to the sharing behavior corresponding to the history screenshot image, and the type of the sharing behavior, determine the target contact user and/or the target contact user group in the application associated with the screenshot image.

12. The device according to claim 11, wherein the one or more processors are further configured to:
obtain a feature value of the at least one history screenshot image; and
determine a feature value of the screenshot image;
determine similarity between the feature value of the screenshot image and the feature value of the history screenshot image; and
in response to the similarity satisfying the similarity condition, determine the history screenshot image to be the to-be-used history screenshot image.

13. The device according to claim 11, wherein the one or more processors are further configured to:
if the screenshot image is shared before a current moment, record the sharing to obtain the history screenshot image, the identifier of the sharing application corresponding to the history screenshot image, the parameter related to the sharing behavior corresponding to the history screenshot image, and the type of the sharing behavior; and
store the history screenshot image, the identifier of the sharing application corresponding to the history screenshot image, the parameter related to the sharing behavior corresponding to the history screenshot image, and the type of the sharing behavior.

14. The device according to claim 13, wherein the one or more processors are further configured to:
store a feature value of the history screenshot image.

15. The device according to claim 9, wherein the one or more processors are further configured to:
in response to a first trigger event, display the recommended area in the sharing area of the screenshot image.

16. The device according to claim 9, wherein the one or more processors are further configured to:
automatically display the recommended area in the sharing area of the screenshot image.

17. A non-transitory computer-readable storage medium storing a computer program that, when executed by one or more processors, causes the one or more processors to:
in response to a screenshot instruction, obtain a screenshot image;
based on the screenshot image, determine an object associated with the screenshot image, including:
obtaining at least one history screenshot image, an identifier of a sharing application corresponding to the history screenshot image, a parameter related to a sharing behavior corresponding to the history screenshot image, and a type of the sharing behavior;
display a recommended area in a sharing area of the screenshot image, including:

in response to the object associated with the screenshot images including at least a target contact user and/or a target contact user group in an application associated with the screenshot image, displaying an operation controller of the application in an area of the sharing area of the screenshot image except for the recommended area, and displaying an operation controller of the target contact user and/or the target contact user group in the recommended area; and in response to a trigger instruction on the operation controller of the object, perform a sharing operation to share the screenshot image with the object.

18. The non-transitory computer-readable storage medium according to claim 17, wherein the object associated with the screenshot image includes an application associated with the screenshot image.

* * * * *